Nov. 22, 1966  L. K. DAVIS ETAL  3,287,676
TORQUE DEVICE HAVING A DIAMAGNETIC ROTOR
Filed April 24, 1964  2 Sheets-Sheet 1

INVENTORS.
LOUIS K. DAVIS
SANFORD M. WEINBERGER
BY Henry W. Kaufmann
AGENT

INVENTORS.
LOUIS K. DAVIS
SANFORD M. WEINBERGER
BY Henry W. Kaufmann
AGENT

United States Patent Office 3,287,676
Patented Nov. 22, 1966

3,287,676
TORQUE DEVICE HAVING A
DIAMAGNETIC ROTOR
Louis K. Davis, Phoenixville, and Sanford M. Weinberger, Philadelphia, Pa., assignors to General Electric Company, a corporation of New York
Filed Apr. 24, 1964, Ser. No. 362,306
5 Claims. (Cl. 335—306)

This invention pertains to the art of producing torques by means of magnetism.

In the operation of vehicles in space in conditions of free fall, in order to orient such vehicles in particular angular directions, it is customary to apply torques which, by terrestrial standards, are extremely small. Thus such torques may be the result of the pressure of solar radiation upon the surface of the body to be oriented, or of the gradient of gravity. When two different parts of such a vehicle are oriented by two different means, it is sometimes beneficial to couple them by a means which can provide, for small angular displacements, a very small restoring torque. There is a more general need for very weak restoring torque devices for very sensitive rotational measuring devices, such as galvanometers. It is difficult to provide extremely weak restoring torques with fixed neutral or zero positions. Ferromagnetic substances acted on by a magnetic field may be used, but since they function by attraction (rather than repulsion) according to an inverse law, they tend to produce instability; and they are subject to the disadvantage of retentivity or hysteresis, which causes the neutral or rest position of such a device to depend upon its previous history. Mechanical springs for very small torques are fragile, and liable to zero shift from thermal cycling and consequent gradual stress relief.

We have invented a means for producing small restoring torques by the use of diamagnetic materials. In our copending application entitled "Diamagnetic Bearing," filed April 24, 1964, Serial No. 362,307, we disclose the use of a diamagnetic material in cooperation with a magnetic field source to form a bearing for use in gravitational fields much less than one g. The general object of that invention is to provide a bearing which has effectively no static restraining torque to be overcome before rotation is possible. This is achieved by making the diamagnetic material magnetically isotropic around the center of rotation of the bearing. In the present invention, on the contrary, we deliberately impair the circular symmetry of the diamagnetic element, as (for instance) by providing it with salient projections. When the structure thus provided is placed in a non-uniform magnetic field, it will tend to rotate so that the salient projections are moved to the points of weakest field; once it has so rotated, any displacement from its rest point will create a restoring torque. Since diamagnetism, unlike ferromagnetism, shows no retentivity or hysteresis, the rest or zero point of such a "spring" will always be the same. Also, the absence of saturation facilitates design of antipoles to provide nonlinear torque-displacement relationship.

Thus our general objects are to provide very small restoring torques whose rest or reference points will be stable, not subject to random shifting nor to dependence upon previous history; and to provide such torques which may have an arbitrary relation of torque to angular displacement, particularly a characteristic in which the restoring force increases with displacement from the neutral position, thus promoting stability. These objects imply many other objects, such as providing an inexpensive device, providing a reliable device, providing a device embodying diamagnetic material, etc., which it would be fatuous to recite.

For the better understanding of our invention we have provided figures of drawing in which.

Figure 1:
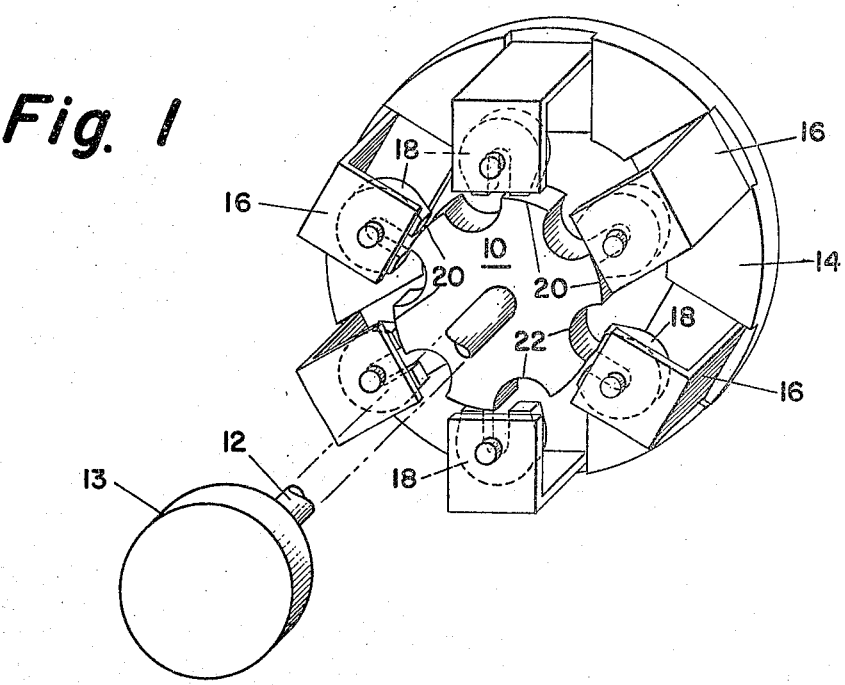
FIG. 1 represents a first embodiment of our invention.

In FIG. 1 there is represented a diamagnetic rotor 10, which may be made of bismuth cast and machined to the shape shown. A nonmagnetic shaft 12 is fastened by any convenient conventional means within the central hole of rotor 10. (The term "nonmagnetic" has the usual significance of "not ferromagnetic;" since all materials are diamagnetic, paramagnetic, or ferromagnetic, there is not, strictly speaking, a literally nonmagnetic material.) This shaft is represented as extending to a disc type member 13, which represents a device to which the generated torques are to be applied. Since there are numerous devices to which our invention may be applied, it is not possible to represent all of them generically by any more significant symbol than the rectangle.

The stator portion of the embodiment represented in FIG. 1 comprises the following: A base ring 14 of nonmagnetic material is provided with brackets 16, also of nonmagnetic material. To each bracket 16 is fastened a permanent magnet 18, of the general bent form known as a horseshoe magnet. The poles of magnets 18 face inward toward the center of rotor 10, producing strong fields adjacent to each magnet. Rotor 10 is provided with salient antipoles 20 which, in the embodiment actually operated, were formed by machining from an initially circular blank the partly circular portions designated by reference number 22. The term "antipole" is used to distinguish from the conventional term "magnetic pole." A magnetic pole is a region where magnetic flux becomes more dense. We have here to describe a diamagnetic projection where the magnetic flux becomes less dense. The term "antipole" seems apposite, when defined, and has the advantage for the present purpose of distinguishing the antipoles from the poles of the permanent magnets. In the embodiment actually operated, rotor 10 was ⅝ inch thick and 2½ inches in diameter. The partly circular notches 22 had their centers located on the circumference of the circular blank previously mentioned, the centers being located at 60-degree intervals around the circumference, i.e., equally spaced around the circumference. The radius of each such notch was 0.34 inch. Thus the machining operation produced a bismuth rotor having six equally spaced and dimensionally equal salient antipoles 20—a number equal to the number of the permanent magnets 18.

The tendency of a magnetic field to repel a diamagnetic material causes the rotor 10, if not restrained by external torques, to rotate so that its antipoles 20 lie in the spaces between the magnets 18, with the notches 22 lying immediately opposite the poles of magnets 18. That is, the diamagnetic rotor 10 will turn to minimize the magnetic field flowing through it. If a torque is applied to shaft 12 to displace the rotor 10 from the rest or neutral position described, rotor 10 will move so that its salient antipoles 20 are moved closer to the poles of magnets 18, where their magnetic fields are stronger, and consequently the magnets 18 will repel the salient antipoles 20, producing a restoring torque. It is evident that the closer the antipoles 20 are moved to opposition to the poles of magnets 18, the greater will be the repulsive force between the antipoles 20 and the magnets 18. The particular law of variation of the resultant torque will vary with the magnetic geometry of rotor 10. In the simplest application of the term "magnetic geometry," it means simply the shape of the salient antipoles 20 of the rotor 10. However, it is evident that it is not actually necessary that salient antipoles such as 22 be provided; if, instead of the notches 22, circular holes were formed in a circular blank so that the magnetic characteristics resulting were similar to those of the rotor 10 actually represented, it is evident that the rotor produced by thus drilling a circular blank would function in our invention like rotor 10; although the drilled rotor would in fact have no *salient* antipoles, the undrilled portions would function as non-salient antipoles. What is actually required of the rotor is that it be so formed that it have magnetic characteristics similar to those produced by salient antipoles; to describe this properly, the term "magnetic geometry" seems suitably significant, in the light of the conventional meanings of the terms "magnetic" and "geometry." The effect of the desired magnetic geometry is to make the rotor magnetically nonuniform in a plane normal to its axis of rotation; that is, when rotated in such a plane, it will present varying magnetic reluctance to a pair of poles placed near it. The restriction to rotation in a plane is necessary since even a uniform disk would, if rotated e.g. about an axis lying in its plane, present a varying magnetic reluctance. Since diamagnetic materials do not, so far as is known, show either saturation or hysteresis, a given magnetic geometry will remain fixed regardless of the strength of magnetic fields applied or of its previous magnetic history.

It is evident that the range of operation of the embodiment represented is limited to a total rotation of slightly less than 60 degrees, that is, 30 degrees in either direction from the neutral or rest position in which the salient antipoles 20 lie equally remote from adjacent magnets 18. For, if a salient antipole 20 is displaced more than 30 degrees from its neutral position, it will be moved past its point of nearest approach to the poles of a magnet 18, and that magnet 18 will repel the given antipole 20 in the same direction in which it has already been rotated. If only a single magnet 18 were provided, and a rotor 10 were used which had only a single salient antipole, then the range of operation would be slightly less than a full circle. However, such a design would have the possibly undesirable effect of producing a net translational force on the rotor 10, tending to repel the rotor from the magnet at all times and thus loading the bearings carrying the shaft 12. For this reason, circularly symmetrical arrangements of the magnets 18 are preferred.

In FIG. 1, bearings supporting shaft 10 have been assumed to be in device 13; and connections between device 13 and base ring 14 have not been shown, since they would be simple meechanical structures whose form would vary widely according to design requirements.

Figure 2:
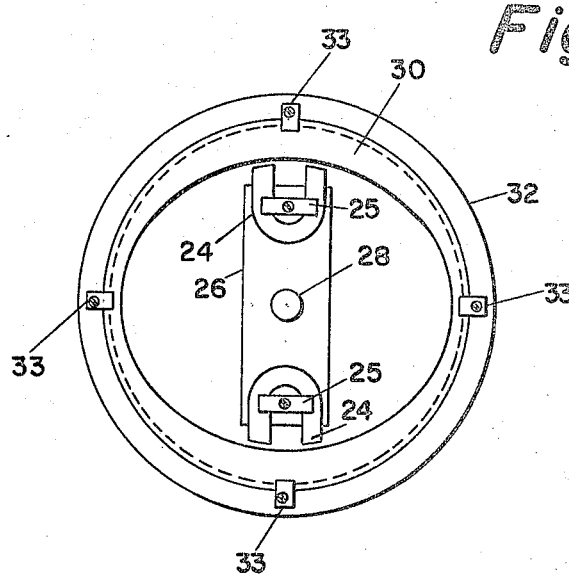
FIG. 2 represents a second embodiment of our invention, produced by geometric inversion of the embodiment of FIG. 1.

FIG. 2 represents an inverted embodiment of our invention, in which the permanent magnets 24 are mounted by battens 25 upon a central hub 26, which is in turn attached to a shaft 28. In this embodiment a diamagnetic stator 30 is represented secured to a base ring 32 by clips 33. This embodiment is generally less desirable than that of FIG. 1 because any stray ferromagnetic materials in the general vicinity will be attracted by the magnets 24 and will thus produce extraneous torques. However, this embodiment is representd for completeness. The hub 26, the shaft 28, and base ring 32, together with fastening means not represented since they may be conventional bolts and nuts, should all be of nonmagnetic material. Indeed, it is generally well known in the art that it is desirable that devices utilizing small magnetic forces be constructed of nonmagnetic materials except for those parts in which particular magnetic properties are required.

FIG. 2 represents specifically the use of two permanent magnets and a diamagnetic member having two antipoles, giving a range of operation slightly less than 90 degrees. It may be seen particularly clearly in this embodiment that the greater the rate of change, with angular displacement of shaft 28, of the spacing between the poles of magnets 24 and the edge of stator 30, the greater will be the torque. Thus by designing the inner edge of stator 30 to have maximum change of radius of curvature for those positions of magnets 24 for which maximum torque is desired, it is possible to adjust the overall curve of restoring torque as a function of angular position of shaft 28.

Figure 3:
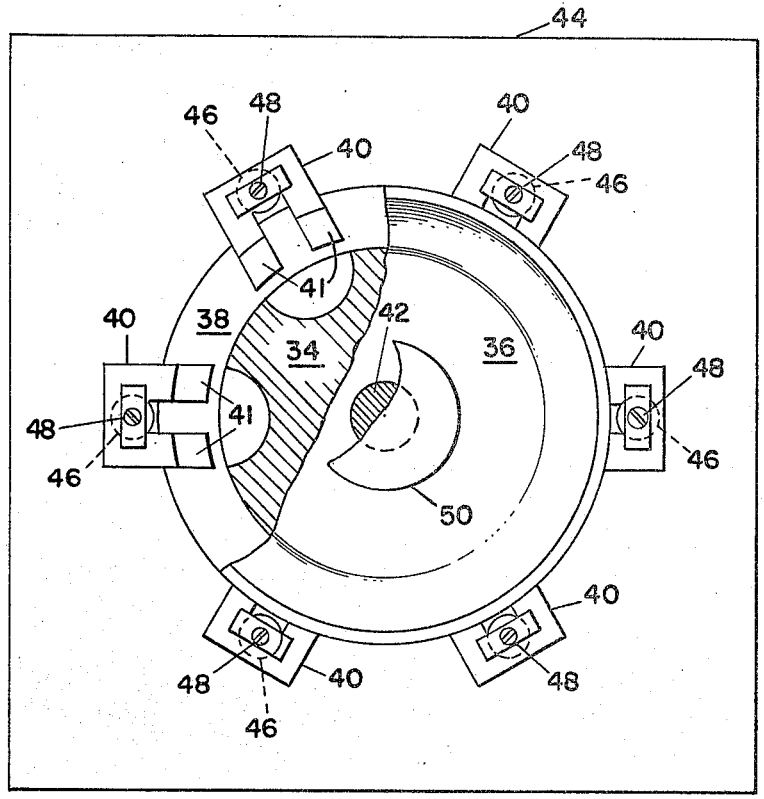
FIGS. 3 and 4 represent in plan and elevation, respectively, a third embodiment of our invention, capable of functioning in a sufficiently weak gravitational field also as a bearing or centering device, as disclosed in our copending application "Diamagnetic Bearing" to which reference has already been made.
Figure 4:
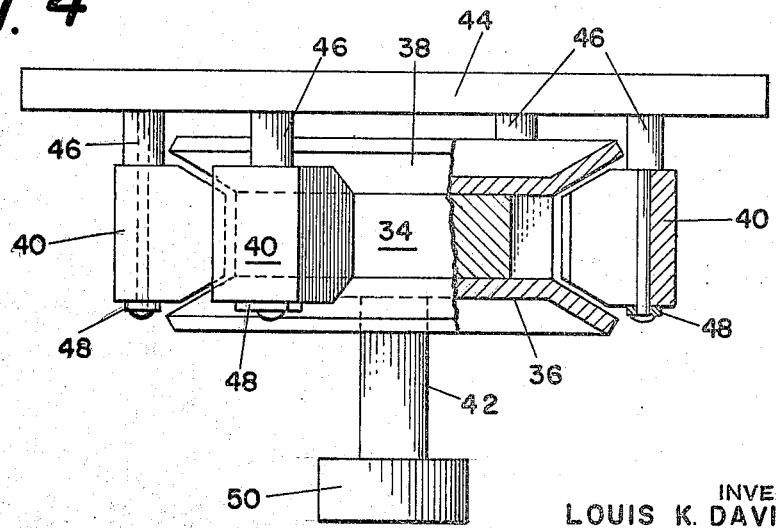

FIGS. 3 and 4 represent the incorporation, in an embodiment of our present invention similar to that represented in FIG. 1, of the diamagnetic bearing which is the subject of our copending application entitled "Diamagnetic Bearing," Serial No. 362,307, filed April 24, 1964. In this embodiment, diamagnetic rotor 34 is identical with rotor 10 of FIG. 1. However, on either side of rotor 34 there are provided rings 36 and 38 also of diamagnetic material, shaped like truncated cones. Except for possible difficulties in machining, there is no reason why rotor 34 and rings 36 and 38 should not all be of the same piece of metallic bismuth. However, the functions of the different parts are different. Rings 36 and 38 are repelled by the magnets 40 with a force which is substantially independent of the angular position of shaft 42, to which rotor 34 and rings 36 and 38 are all attached. The repulsion of rings 36 and 38 by magnets 40 will tend to maintain rotor 34 centrally located among magnets 40, and this, in sufficiently weak gravitational fields, will produce the effect of a bearing, as disclosed in our referenced copending application. To maximize this effect, the pole pieces 41 of magnets 40 are chamfered to leave only small air gaps between the pole pieces and rings 36 and 38. The pole pieces 41 are, of course, also closely adjacent to the locus of the salient antipoles of rotor 34 so that it may provide restoring torques as above described. The supporting means for magnets 40 are shown as a base plate 44 having projecting bosses 46 to which magnets 40 are held by battens 48. In the present embodiment the torque utilization device 50 need not provide the functions of a bearing but may be, for example, a device subjected to torques from radiation pressure while in a free-fall or zero-gravity condition. Such a possible use of our inventions is described in more detail in our referenced copending application.

While it has thus been disclosed how both of our inventions may be combined in a single mechanical structure, it should be observed that the separate functions of the two inventions are separate and distinct, and capable of being practiced separately. The bearing depends for its functioning upon a diamagnetic structure whose magnetic characteristics are independent of its angular position around the axis of rotation; and the present invention depends for its operation upon a diamagnetic structure whose magnetic characteristics are strongly dependent upon its angular position around the axis of rotation. Thus, even if these two diamagnetic structures are combined in a single piece of metal, the separate functions of the different parts of the single piece are different and clearly separable.

While it is natural to regard the portions of a device attached to the shaft as the rotating parts, and the parts attached to a housing as stationary (and this approach has been adopted, for convenience, by the use of the terms "rotor" and "stator"), the reference to possible uses in space emphasizes that what is of importance in any case involving our inventions is relative rotation or angular displacement. Consequently, it must be recognized that the choice of any given member as stationary is purely arbitrary for convenience of comprehension by those accustomed to thinking in terms of ordinary electric motor structures. Thus, the nominal stator and nominal rotor must be recognized as being *both* located about a center or axis of relative rotation.

The appended claims are submitted in subparagraph form, in accordance with a request of the Commissioner of Patents, to render them more easily readable; their subdivision into paragraphs and subparagraphs does not indicate any necessary relative importance or relation of the recitals therein.

What is claimed is:

1. A device for producing restoring torque upon rotational displacement from a neutral or zero position, comprising:
    a magnetic structure and a diamagnetic structure located around a common center of relative rotation, free to rotate relatively thereabout,
    said magnetic structure having pairs of magnetic poles opposed to the said diamagnetic structure,
    said diamagnetic structure being magnetically non-uniform in a plane including the said center of relative rotation and a portion of the said diamagnetic structure opposed to the poles of the said magnetic structure.

2. A device for producing restoring torque upon rotational displacement from a neutral or zero position, comprising:
    a magnetic structure having a central aperture and having a plurality of pairs of magnetic poles disposed on the boundaries of the said aperture;
    a diamagnetic structure, lying within the said central aperture of the said magnetic structure, and having a plurality of antipoles opposing the said pairs of poles.

3. A device for producing restoring torque upon rotational displacement from a neutral or zero position, comprising:
    a plurality of horseshoe magnets mounted with their pole faces tangent to a common first circle,
    a diamagnetic member having a plurality of antipoles tangent to a second common circle concentric with the said first circle.

4. A device as claimed in claim 2, in which the said antipoles equal in number the said pairs of poles.

5. A device as claimed in claim 3 in which the said antipoles equal in number the said horseshoe magnets.

No references cited.

BERNARD A. GILHEANY, *Primary Examiner.*

GEORGE HARRIS, JR., *Assistant Examiner.*